March 2, 1943. H. J. LUFF 2,312,658
COMBINED SOIL WASTE AND VENT FITTING
Filed May 7, 1942

INVENTOR.
HENRY J. LUFF
BY

Patented Mar. 2, 1943

2,312,658

UNITED STATES PATENT OFFICE 2,312,658

COMBINED SOIL WASTE AND VENT FITTING

Henry J. Luff, Cleveland, Ohio, assignor to J. A. Zurn Manufacturing Company, Erie, Pa., a corporation of Pennsylvania Application May 7, 1942, Serial No. 442,126

1 Claim. (Cl. 285—210)

This invention relates generally to combined waste and vent fittings.

All devices of this character made according to the teachings of the prior art and with which I am familiar have had great difficulty in maintaining a trap seal in the branches to the drain line. Many times water passing from the branch waste lines down into the drain completely filled the waste and air lines, resulting in siphonage of the water in the trap, thereby permitting noxious gases to pass from the drain lines through the building.

It is accordingly an object of my invention to overcome the above and other objections in combined waste and vent fittings, and it is more particularly an object of my invention to provide a combined waste and vent fitting which is simple in construction and economical in manufacture and cost.

Another object of my invention is to provide a combined waste and vent fitting which may be installed in a minimum of space.

Another object of my invention is to provide a combined waste and vent fitting whereby the sides of the hubs of the branch lines do not extend outwardly and sidewardly beyond the sides of the main waste and vent pipe.

Another object of my invention is to provide a combined waste and vent fitting wherein the branch waste pipes enter the larger waste and vent pipe off center in order to permit air in the main waste and vent pipe at all times and prevent breaking the seal of the trap in the drain line.

Other objects of my invention will become evident from the following detailed description taken in conjunction with the accompanying drawing, in which.

Figure 1:
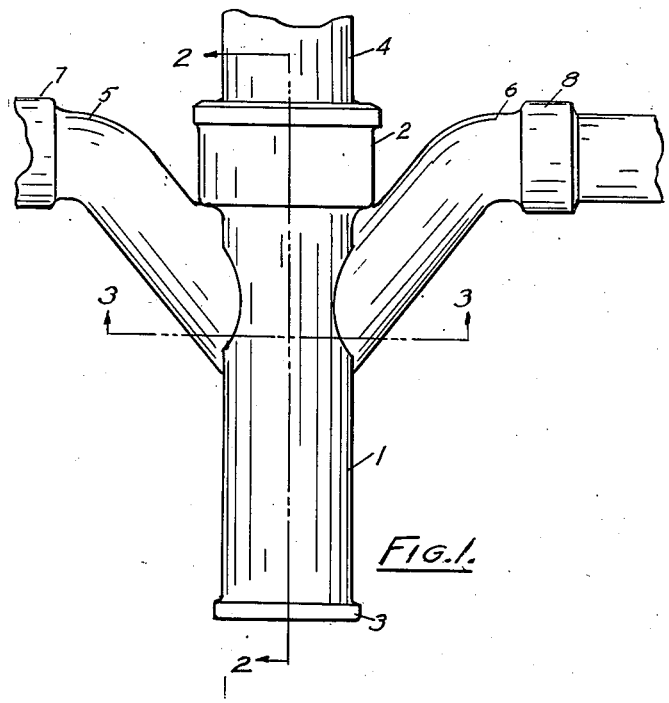
Fig. 1 is a side elevational view of my novel combined waste and vent fitting.
Figure 2:
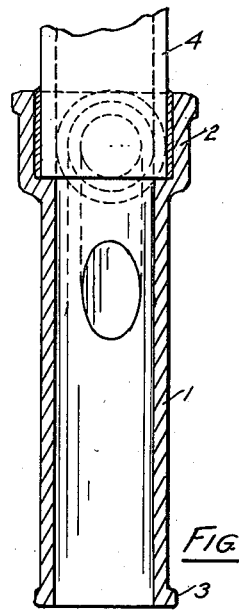
Fig. 2 is a view taken on the line 2—2 of Fig. 1.
Figure 3:
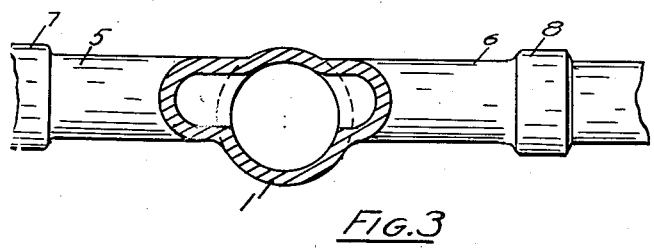
Fig. 3 is a view taken on the line 3—3 of Fig. 2.

Referring to the drawing, Figs. 1, 2 and 3 show a combined waste and vent fitting, comprising a waste and air vent pipe 1 having hub and spigot ends 2 and 3 for connection to the waste and air vent line 4 leading from the main drain line. Branch waste lines 5 and 6 enter the waste and vent pipe 1 considerable off center as shown in Figs. 2 and 3. The sides of the hubs 7 and 8 of the waste branches 5 and 6 are preferably within the limits described by vertical planes extending from sides of the waste and vent pipe 1. This permits the installation of my novel fitting in a space four inches in width, being now the allowable space in new construction for plumbing fittings.

In operation, waste water enters the main waste and vent pipe 1 from the branches 5 and 6 and passes downwardly on one side of the waste and vent pipe 1 to the main drain line (not shown). By reason of the water from the waste branches 5 and 6 passing down one side of the main waste and vent pipe 1, it will be apparent that air and gases will pass up and down the other side of the pipe, thereby preventing the sealing of the main air vent pipe. In this construction, there is very little possibility of breaking the seal in the trap in the drain line because of the sealing of the waste and air vent pipe 1.

From the above, it will be seen that I have provided a very simple and novel combined waste and vent fitting which requires a minimum of space and which assures perfect sealing of the trap in the waste line at all times.

Various changes may be made in the specification of the present invention without departing from the spirit thereof or from the scope of the appended claim.

What I claim is:

A combined waste and vent fitting comprising a main waste and vent pipe, and branch waste lines extending into said main pipe at an angle, a vertical plane through said waste lines passing to the side of the axis of said main pipe whereby water passing from said waste pipes passes downwardly on one side of said main pipe.

HENRY J. LUFF.